United States Patent
Perison, Sr.

[15] 3,635,435
[45] Jan. 18, 1972

[54] BREAKAWAY SUPPORT FOR REAR VISION MIRROR

[72] Inventor: Ronald C. Perison, Sr., East Aurora, N.Y.

[73] Assignee: The Lamson & Sessions Co., Cleveland, Ohio

[22] Filed: Mar. 16, 1970

[21] Appl. No.: 19,809

[52] U.S. Cl. ..........................248/475 A, 248/484, 287/20, 248/276
[51] Int. Cl. ......................................................B60r 1/04
[58] Field of Search...................248/50, 73, 188, 223, 225, 248/239, 475 A, 475 B, 475 R, 483; 287/20.5, 103 A, 128; 85/1 H, 1 K, 61; 306/35; 285/2

[56] References Cited

UNITED STATES PATENTS

| | | | |
|---|---|---|---|
| 3,367,616 | 2/1968 | Bausch et al............................ | 248/483 |
| 2,083,054 | 6/1937 | Cline ........................................ | 285/2 |
| 2,998,217 | 7/1961 | Englis et al............................ | 248/223 X |
| 2,626,772 | 1/1953 | Flora........................................ | 248/239 |
| 1,762,776 | 6/1930 | Gardner.................................... | 248/188 UX |
| 2,098,997 | 11/1937 | Bramming.............................. | 248/239 X |
| 3,534,938 | 10/1970 | Jordan et al. ........................ | 248/475 A |
| 2,882,110 | 4/1959 | Mutchnik .............................. | 248/188 |

FOREIGN PATENTS OR APPLICATIONS

| | | | |
|---|---|---|---|
| 66,286 | 3/1950 | Netherlands............................... | 85/61 |
| 1,069,702 | 5/1967 | Great Britain .......................... | 85/1 H |
| 1,132,384 | 10/1968 | Great Britain ...................... | 248/475 A |

Primary Examiner—William H. Schultz
Attorney—Sommer, Weber & Gastel

[57] ABSTRACT

A rear vision mirror support including a stem mounting a rear vision mirror at one end and having a connector at its other end securing it to a base mounted on a vehicle, the connector including a bolt having an annular groove thereon which weakens it sufficiently so that it will fracture when the mirror-supporting stem is subjected to an impact force of a predetermined value.

5 Claims, 8 Drawing Figures

PATENTED JAN 18 1972
3,635,435
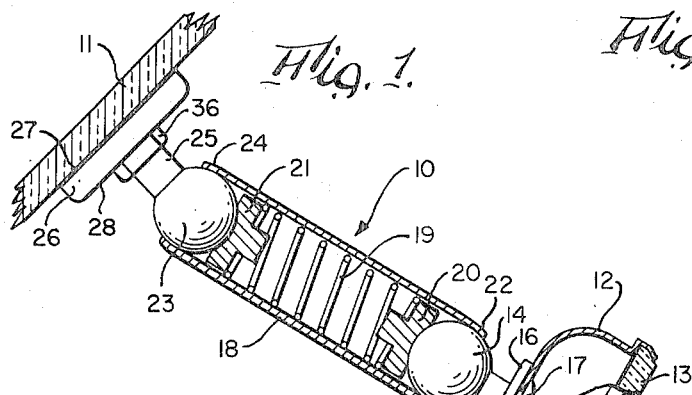
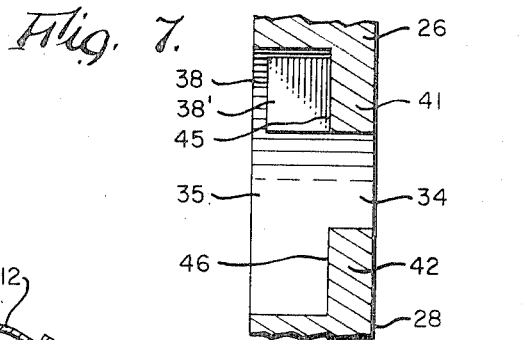
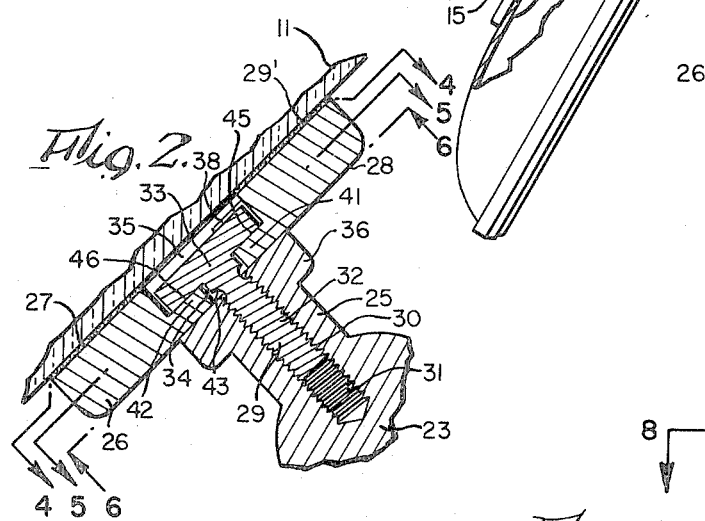
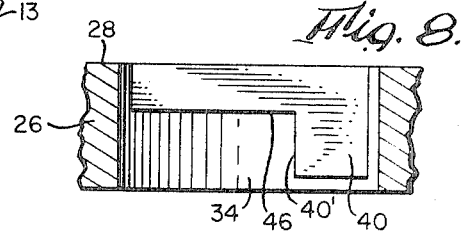
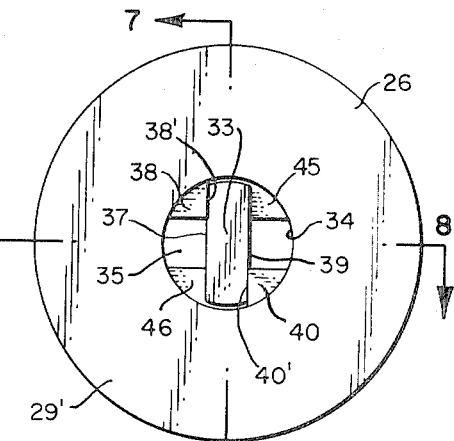
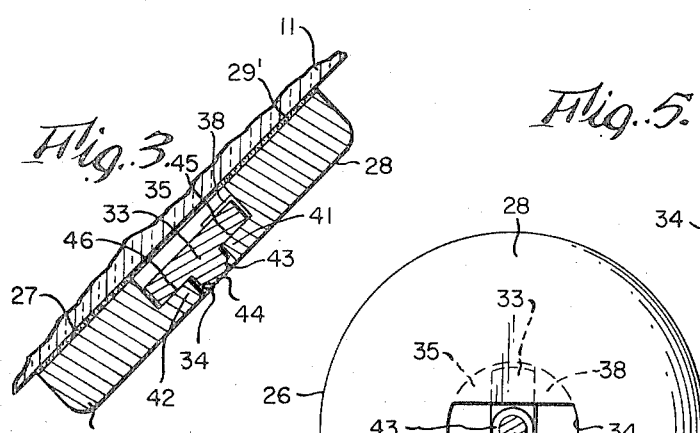
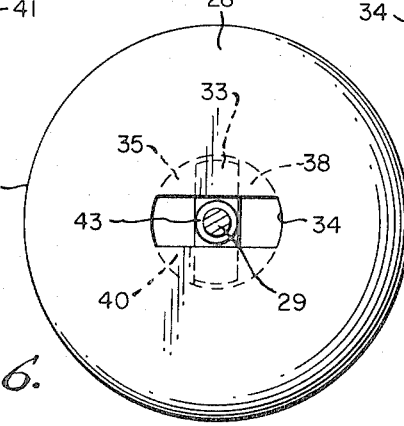
INVENTOR.
Ronald C. Perison, Sr.
BY
Sommer & Weber
ATTORNEYS

BREAKAWAY SUPPORT FOR REAR VISION MIRROR

The present invention relates to an improves supporting construction for an automotive rear vision mirror and more particularly to a construction which will break away under a predetermined impact so as to minimize injury to a person striking the mirror during an accident.

It has been found that severe injuries may occur as a result of a person's being thrown against protruding objects within a vehicle during an accident. The present invention is concerned with overcoming the foregoing problem in relation to protruding rear vision mirrors.

It is accordingly the primary object of the present invention to provide a support for a rear vision mirror which will break away from a base on which it is mounted when it is subjected to a predetermined impact force from any direction, this force being calculated to be one at which injury to a person will be minimal.

Another object of the present invention is to provide an improved rear mirror support of the foregoing type which, after having broken away will not leave any sharp edges which could result in injury.

A further object of the present invention is to provide an improved breakaway support for a rear vision mirror which can be installed in an extremely simple manner and which will remain reliably installed until such time as it may be broken away when struck. A related object is to provide an improved breakaway support wherein the base which is attached to the vehicle can be used to mount replacement supports in the event the original support was broken during impact. Other objects and attendant advantages of the present invention will readily be perceived hereafter.

The present invention relates to a breakaway support for a rear vision mirror comprising a base for attachment to a part of a vehicle, a stem, first means for mounting a mirror at one location on the stem, and second means for mounting the stem on the base so as to support the rear vision mirror relative to the vehicle, such second means including connector means associated with the base and which fractures when subjected to a predetermined impact force, thereby to permit the stem means to break away from the base before serious injury can be inflicted on the person striking the mirror.

The various aspects of the present invention will be more fully understood when the following portions of the specification are read in conjunction with the accompanying drawings wherein:

FIG. 1 is a fragmentary view, partially in cross section, showing in side elevation a rear vision mirror support embodying the present invention;

FIG. 2 is a cross-sectional view taken through the base of the support substantially along line 7—7 of FIG. 4 and showing the manner in which a frangible connector member is mounted in said base;

FIG. 3 is a view similar to FIG. 2 but showing the portion of the connector means which is left in the base member after the mirror support is fractured due to impact;

FIG. 4 is a view taken in the direction of line 4—4 of FIG. 2;

FIG. 5 is a cross-sectional view taken substantially along line 5—5 of FIG. 2;

FIG. 6 is a view taken substantially along line 6—6 of FIG. 2 and showing the outer face of the base;

FIG. 7 is a cross-sectional view taken substantially along line 7—7 of FIG. 4 and showing the structure within the base when the bolt is not in position; and FIG. 8 is a view taken substantially along line 8—8 of FIG. 4 when the bolt is not in position.

The improved rear vision mirror support 10 of the present invention is attached to windshield 11 and in turn is secured to frame 12 which in turn mounts mirror panel 13 in a suitable manner. The rear vision mirror support 10 includes an elongated tube or stem 18 housing a spring 19 which bears on follower discs 20 and 21 at opposite ends thereof. Follower disc 20 in turn bears on pivotable ball 14 which is retained against ejection from tube 18 by means of annular lip 22. Frame 12 is attached to neck 15 attached to ball 14. A collar 16 on neck 15 is located on one side of frame 12 and a peened head 17 is located on the other side of frame 12 to sandwich said frame therebetween. The other follower disc 21 bears on pivotable ball 23 which is retained within tube 19 by annular lip 24. Lips 22 and 24 may be formed in any suitable manner, such as swaging or the like. A neck portion 25 secures ball 23 to base 26 which is attached to windshield 11 by means of a layer of suitable adhesive 27. It will be appreciated that the foregoing assembly of a stem 18 and two pivotable balls 14 and 23 provide an universal mounting which permits mirror 13 to be adjusted to any desired position within the limits of the linkage and the pressure exerted by spring 19 retains the balls in their adjusted positions.

Base 26 is of generally circular disc shape and includes a flat outer face 28 and a flat inner face 29' to which adhesive 27 is bonded. Base 26 is mounted on the windshield 11 by means of said adhesive before the remainder of the supporting structure 10 is mounted thereon. In this respect it is to be noted that the means for attaching the supporting structure to base 26 consists of a bolt 29 having a threaded portion 30 which is received in tapped bore 31 within neck 25. To effect the attachment, shank 32 is partially threaded into tapped portion 31. Bolt 29 includes a transverse head 33 of solid elongated rectangular configuration which is of slightly smaller dimension than slot 34 which extends between outer surface 28 and chamber 35 in base 26. In essence, bolt head 33 and slot 34 comprise a bayonet type of fit. After bolt head 33 is inserted through slot 34 into chamber 35, the hexagonal wrench-receiving nut portion 36 at the end of neck 25 is rotated which in turn causes head 33 to rotate in the same direction until turned transversely of slot 34, whereupon side 37 thereof (FIG. 4) abuts the side 38' of pawl or shoulder stop 38 and side 39 of head 33 abuts the side 40' of pawl or shoulder stop 40 which will prevent head 33 from rotating further. Continued tightening rotation of nut 36 will draw head portion 33 inwardly until such time as slot-forming portions 41 and 42 (FIGS. 2 and 7) of the base are clamped between head portion 33 and nut 36. The opposed pawls which are of less depth then chamber 35, but of greater depth than head portion 33, are recessed slightly below the rear face of the plate to avoid gumming from the cement, but not enough to permit spinning of the bolt head during the insertion. At this point it is to be noted from FIGS. 4, 7 and 8 that when nut 36 is in tightened condition bolt head 33 bears on planar surfaces 45 and 46 which define part of the end boundaries of chamber 35 adjacent pawls 38 and 40 and the head is spaced out of engagement with windshield 11.

The mirror will be securely held in position on its base 26 by means of the above-described stem assembly 10. As noted above, there are circumstances under which stem 10 is subjected to impact forces, as during an accident. In such an event it is desirable that the stem assembly 10 break away before injury is sustained by the person striking the mirror. In accordance with the present invention bolt 29 is provided with an annular undercut 43 on shank 32 proximate the head portion 33 and the juncture line 44 of base 26 and nut 36. This undercut 43 constitutes a weakened frangible portion of the bolt which will fracture under a predetermined force from any direction to effect the desired breakaway of the stem 18. This fracture will occur across line 44 (FIG. 3) which is substantially flush and preferably below the front surface 28 of the base so that a person striking this portion of the base will not be injured. Any other type of weakening arrangement which is analogous to or achieves the same function as undercut 43 may be used. It will be appreciated that an impact from any direction will have substantially the same bolt-fracturing effect because of the general symmetry of orientation of the parts, such as groove 43, nut 36 and neck 25 about the longitudinal axis of bolt shank 32. The portion of the bolt remaining after fracture, as shown in FIG. 3, may be removed by manipulating it with a thin-nosed plier preparatory to inserting a new mirror-carrying stem assembly in the preexisting base on the windshield.

While base 26 has been shown as being adhesively bonded to a windshield, it will be appreciated that it can be secured to any desired part of the vehicle in any suitable manner, and the base may be suitably modified to effect the foregoing. It also will be appreciated that the breaking of the stem will also tend to prevent more costly fracturing of the windshield.

What is claimed is:

1. A support for a rear vision mirror comprising a base for attachment to a vehicle part, stem means, first means for mounting a mirror at one location on said stem means, and second means spaced from said first means for mounting said stem means on said base, said second means including connector means which fractures when subjected to a predetermined impact to permit said stem means to break away from said base and which comprises a bolt having a shank connected to said stem means and provided with a frangible portion proximate and juncture of said base and stem means and an elongated head portion connected to said base and extending transversely of said shank, a slot in said base receiving and of slightly larger dimension than said head portion, and a chamber in said base in communication with said slot, said chamber being of a dimension to permit rotation of said head portion therein after said head portion has passed through said slot but having stop means for holding said head portion against rotation when said head portion is turned transversely of said slot.

2. The support of claim 1 wherein said stop means comprise a pair of opposed shoulders within said chamber for engaging opposite sides of said head portion.

3. The support of claim 1 wherein said second means include nut means on said stem means for threaded engagement with said shank for cooperating with said head portion to clamp therebetween portions of said base forming said slot when said nut means is tightened.

4. The support of claim 3 wherein said stop means comprise a pair of opposed shoulders within said chamber for engaging opposite sides of said head portion.

5. The support of claim 4 wherein said head portion is of a depth which is less than the depth of said chamber so as not to engage said vehicle part when said nut means is in a tightened condition, and said shoulders are of a depth which is less than the depth of said chamber but greater than the depth of said head portion so as to prevent spinning of said head portion during insertion thereof.

* * * * *

PO-1050
(5/69)

UNITED STATES PATENT OFFICE
CERTIFICATE OF CORRECTION

Patent No. 3,635,345                Dated January 18, 1972

Inventor(s) Jerome A. Rodder

It is certified that error appears in the above-identified patent and that said Letters Patent are hereby corrected as shown below:

Title page, paragraph [63] "Oct. 2" should read --Oct. 23--.

Col. 1, line 57, "absorbent" should read "adsorbent--.

Col. 4, line 40, "controlling metering" should read --controlled metering--.

Col. 4, line 71, "absorbent" should read --adsorbent--.

Col. 4, line 72, "pressure for" should read --pressure required for--.

Col. 6, line 31, "less than 20°" should read --less than about 20°--.
(Claim 1)

Signed and sealed this 27th day of June 1972.

(SEAL)
Attest:

EDWARD M. FLETCHER, JR.             ROBERT GOTTSCHALK
Attesting Officer                    Commissioner of Patents